(12) United States Patent
Luo et al.

(10) Patent No.: US 6,642,325 B2
(45) Date of Patent: Nov. 4, 2003

(54) SILICA GEL-SUPPORTED CATALYST COMPONENT FOR ETHYLENE (CO) POLYMERIZATION, CATALYST THEREFROM AND USE OF THE SAME

(75) Inventors: Hekuan Luo, Beijing (CN); Ruiguo Tang, Beijing (CN); Kejing Gao, Beijing (CN); Qinfang Zhao, Beijing (CN); Jingyan An, Beijing (CN); Hua Yang, Beijing (CN); Jinsheng Huo, Beijing (CN)

(73) Assignees: China Petroleum & Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 0 days.

(21) Appl. No.: 09/935,333

(22) Filed: Aug. 22, 2001

(65) Prior Publication Data

US 2002/0065378 A1 May 30, 2002

(30) Foreign Application Priority Data

Aug. 22, 2000 (CN) .......................... 00123560 A

(51) Int. Cl.$^7$ .................................. C08F 4/02
(52) U.S. Cl. ................. 526/129; 526/352; 526/348; 526/901; 526/143; 526/123.1; 502/103; 502/115; 502/118; 502/121; 502/125; 502/128
(58) Field of Search ................ 502/103, 115, 502/118, 121, 125, 128; 526/129, 143, 352, 348, 901, 123.1

(56) References Cited

U.S. PATENT DOCUMENTS

| 3,225,023 | A | | 12/1965 | Hogan et al. ............. 260/94.9 |
|---|---|---|---|---|
| 4,242,230 | A | | 12/1980 | Ueno et al. ................. 252/429 |
| 4,242,231 | A | | 12/1980 | Ueno et al. ................. 252/429 |
| 4,293,673 | A | | 10/1981 | Hamer et al. ................ 526/88 |
| 4,302,565 | A | | 11/1981 | Goeke et al. ................ 526/88 |
| 4,302,566 | A | | 11/1981 | Karol et al. ................ 526/125 |
| 4,303,771 | A | | 12/1981 | Wagner et al. ............. 526/125 |
| 4,525,469 | A | * | 6/1985 | Ueda et al. ................. 502/125 |
| 4,693,990 | A | * | 9/1987 | Hiroyuki et al. ............ 502/116 |
| 5,079,204 | A | * | 1/1992 | Lee .......................... 502/104 |
| 5,661,097 | A | | 8/1997 | Spencer et al. ............ 502/115 |
| 5,744,567 | A | | 4/1998 | Hüffer et al. ............ 526/348.6 |
| 6,200,922 | B1 | | 3/2001 | Hüffer et al. ............... 502/120 |

FOREIGN PATENT DOCUMENTS

| CN | 1230552 | 10/1999 |
|---|---|---|
| EP | 0812861 | 12/1997 |
| EP | 0942007 | 9/1999 |

* cited by examiner

Primary Examiner—Ling-Siu Choi
(74) Attorney, Agent, or Firm—Ladas & Parry

(57) ABSTRACT

The present invention relates to a silica gel-supported catalyst component suitable for ethylene (co)polymerization, a catalyst therefrom and use of the same. The catalyst component according to the present invention is obtained by supporting the reaction product of a titanium compound, a halide promoter, a magnesium compound and an electron donor on silica gel having a larger specific surface area. When the resultant catalyst is used for ethylene polymerization, especially gas phase fluidized bed polymerization, not only the activity is substantially enhanced, but also the hydrogen response and the copolymerizability of ethylene with other alpha-olefins are improved. The catalyst is especially suitable for the fluidized bed polymerization operated in a condensed state, with high quality LLDPE resins being obtained.

18 Claims, No Drawings

SILICA GEL-SUPPORTED CATALYST COMPONENT FOR ETHYLENE (CO) POLYMERIZATION, CATALYST THEREFROM AND USE OF THE SAME

FIELD OF THE INVENTION

The present invention relates to a silica gel-supported catalyst component suitable for ethylene (co) polymerization, a catalyst therefrom and its use in ethylene (co)polymerization, in particular in a gas phase fluidized bed process operated in a condensed state.

BACKGROUND OF THE INVENTION

It is well known that microspherical silica gels (having an average particle size of 10 to 100 microns) has been widely applied in catalysts for olefin polymerization as the carrier, especially in catalysts for olefin polymerization by a gas phase process, and silica gels which have been used currently include SYLOPOL 948, SYLOPOL 955 and XPO-2402 manufactured and marketed by Grace Corporation, USA and SD490 manufactured and marketed by Crosfield Corporation, typically having a specific surface area of about 300 m$^2$/g or even less. When applied for supporting catalysts, the amount of the active components supported on these silica gels are limited and thus the improvements in catalytic activity are limited. For example, U.S. Pat. Nos. 4,293,673, 4,302,565, 4,302,566 and 4,303,771 disclose a series of catalysts suitable for ethylene polymerization by a gas phase fluidized bed process, in which the above mentioned silica gels are used as the carrier. Up to now, most of such commercially available catalysts are obtained by supporting a magnesium compound, a titanium compound and an electron donor onto SYLOPOL 955 silica gel and when they are used for ethylene polymerization by a gas phase fluidized bed process, the catalytic activity is typically about 3500 g PE/g Cat; however, when they are used in a gas phase fluidized bed process operated in a condensed state, the catalytic activity is substantially lowered due to the shortening of the residence time of the catalysts, thereby leading to an increase in the ash content of the resultant ethylene polymers, which in turn deteriorates the quality of ethylene polymers. Therefore, enhancing the activity of such catalysts is one of the key factors for the improvement in the quality of the ethylene polymers. If, however, only the specific surface area of silica gel is increased, on one hand, the activity of the catalysts when used for olefin polymerization is enhanced to some extent; on the other hand, the pore size of silica gel is decreased due to the increase in its specific surface area, thus other properties such as hydrogen response, copolymerizability of ethylene with other alpha-olefins and the like decrease dramatically (cf. U.S. Pat. No. 3,225,023). Therefore, taking the balance among various properties into account, the currently commercialized silica gel carrier materials for ethylene polymerization by a gas phase process is typically controlled to have a specific surface area of about 300 m$^2$/g.

SUMMARY OF THE INVENTION

After extensive and repetitive investigation, the present inventors have found that by employing silica gels having a larger specific surface area and supporting thereon a magnesium compound, a titanium compound and an electron donor compound, as well as a halide promoter, the resultant catalyst has not only a largely enhanced activity when used for olefin polymerization, but also excellent hydrogen response and superior copolymerizability of ethylene with other alpha-olefins. Especially in the gas phase fluidized bed process operated in a condensed state, which represents an advanced process currently, the catalyst according to the present invention shows a good balance among various properties.

The object of the present invention is to provide a highly active silica gel-supported catalyst component suitable for ethylene (co)polymerization, which has overcome the disadvantages associated with the prior silica gel-supported titanium based catalyst, such as low activity and the like.

Another object of the present invention is to provide a catalyst for ethylene (co)polymerization.

Still another object of the present invention is to provide the use of the catalyst in accordance with the present invention for olefin (co)polymerization.

In its one aspect, the present invention provides a highly active silica gel-supported catalyst component suitable for ethylene (co)polymerization which is a titanium-containing active component supported on a porous inert carrier material, comprising the reaction product of at least one titanium compound, at least one magnesium compound, at least one halide promoter, and at least one electron donor, wherein said porous inert carrier material is spherical or spheroidal silica gel having an average particle size of 10 to 100 microns, a specific surface area of 300 to 1000 m$^2$/g, a pore volume of 2.0 to 5.0 ml/g and an average pore diameter of 5 to 45 nanometers.

In its second aspect, the present invention provides a catalyst comprising the supported catalyst component in accordance with the present invention.

In its third aspect, the present invention relates to the use of the catalyst in accordance with the present invention for olefin (co)polymerization.

DETAILED DESCRIPTION OF THE INVENTION

The catalyst component in accordance with the present invention is obtained by impregnating a carrier material with the reaction product of at least one titanium compound, at least one magnesium compound and at least one electron donor compound so as to support the reaction product onto the carrier material. It should be particularly noted that the carrier material is selected among spherical or spheroidal silica gels having a larger specific surface area, with dehydrated silica gels being preferred. The hydroxyl content on the surface is typically adjusted by controlling the conditions for heat-activating silica gels Preferably, silica gels have an average particle size of 10 to 100 microns, more preferably 20 to 80 microns, most preferably 30 to 60 microns; a specific surface area of 300 to 1000 m$^2$/g, more preferably 400 to 800 m$^2$/g, most preferably 600 to 800 m$^2$/g; a pore volume of 1.0 to 6.0 ml/g, more preferably 2.0 to 5.0 ml/g; and an average pore diameter of 5 to 45 nanometers, more preferably 10 to 35 nanometers.

In the catalyst component as mentioned above, at least one halide promoter is also added. The halide promoter is a class of compounds represented by general formula F—R$^1$[R$^2{}_b$X$_{(3-b)}$] wherein F represents a functional group which is chemically reactive with the organoaluminium compound, the titanium compound or hydroxyl groups on silica gels, such as an aldehyde group, an acyl group, a hydroxyl group, an amino group, an ester group and the like; R$^1$ represents a divalent C$_1$–C$_6$ aliphatic or aromatic group which is attached to the functional group F; R$^2$ represents hydrogen, unsubstituted or halogen-substituted C$_1$–C$_6$ alkyl, C$_3$–C$_6$ cycloalkyl or C$_6$–C$_{10}$ aromatic groups, b is 0, 1 or 2, and X is F, Cl or Br.

When F represents a hydroxyl group, said promoter is a class of halogenated alcohol, specific compound being 2,2,2-trichloroethanol ($Cl_3CCH_2OH$), 2,2-dichloroethanol ($Cl_2CHCH_2OH$), 2-chloroethanol ($ClCH_2CH_2OH$), 1,1-dimethyl-2,2,2-trichloroethanol ($Cl_3CC(CH_3)_2OH$), 4-chlorobutanol ($ClCH_2CH_2CH_2CH_2OH$), para-chlorophenol, iso-chlorophenol, ortho-chlorophenol, 2-chlorocyclohexanol and the like, with 2,2,2-trichloroethanol, 2,2-dichloroethanol, 2-chloroethanol and 1,1-dimethyl-2,2,2-trichloroethanol being preferred.

When F represents an acyl group, said promoter is a class of halogenated acyl halide, suitable examples of such compounds being trichloroacetyl chloride, dichloroacetyl chloride, chloroacetyl chloride, o-chlorobenzoyl chloride and 2-chlorocyclohexyl carbonyl chloride, with trichloroacetyl chloride, dichloroacetyl chloride and chloroacetyl chloride being preferred.

In the catalyst component as mentioned above, the magnesium compound, the electron donor compound and the titanium compound have been described in U.S. Pat. No. 4,302,565, which is incorporated herein by reference.

In the titanium-containing catalyst component as mentioned above, the magnesium compound, the electron donor compound and the halide promoter are used in amounts of 0.5 to 50 moles, preferably 1.5 to 5 moles; 0.5 to 50 moles, preferably 1 to 10 moles; 0.5 to 50 moles, preferably 1 to 10 moles, per mole of the titanium compound, respectively.

In the catalyst component in accordance with the present invention, preferable titanium compounds are those represented by the following general formulae:

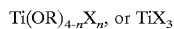

$Ti(OR)_{4-n}X_n$, or $TiX_3$ wherein R is $C_1$–$C_{14}$ aliphatic hydrocarbyl, X is F, Cl, Br or combinations thereof and n is an integer of 1 to 4. Suitable examples are selected from the group consisting of titanium tetrachloride, titanium trichloride, titanium tetrabromide, titanium tetraiodide, titanium tetrabutoxide, titanium tetraethoxide, triethoxy titanium chloride, diethoxy titanium dichloride, ethoxy titanium trichloride and mixtures thereof, with titanium tetrachloride, ethoxy titanium trichloride and titanium trichloride being preferred.

The magnesium compound which can be used is preferably those represented by general formula $MgX_2$, wherein X is Cl, Br, I or combinations thereof. Specific examples can be magnesium dichloride, magnesium dibromide, magnesium diiodide, with magnesium dichloride being perferred.

The electron donor (ED) compound which can be used is preferably selected from the group consisting of alkyl esters of aliphatic or aromatic carboxylic acids, aliphatic ethers, cyclic ethers and saturated aliphatic ketones. Among them, alkyl esters of $C_1$–$C_4$ saturated aliphatic carboxylic acids, alkyl esters of $C_7$–$C_8$ aromatic carboxylic acids, $C_2$–$C_6$ aliphatic ethers, $C_3$–$C_4$ cyclic ethers, $C_3$–$C_6$ saturated aliphatic ketones are preferred. Most preferably are methyl formate, ethyl acetate, butyl acetate, diethyl ether, dihexyl ether, tetrahydrofuran (THF), acetone and methyl isobutyl ketone. These electron donor compounds can be used alone or in a mixture of two or more of them.

The catalyst component in accordance with the present invention is prepared by firstly dissolving the titanium compound and the magnesium compound into the electron donor compound to form a mother liquor and then impregnating a silica gel carrier having a larger specific surface area with the mother liquor, preferably by a process comprising the steps of:

(1) activating the silica gel carrier material in a conventional manner, preferably dehydrating at a temperature of 600° C. for 4 hours;

(2) adding the heat-activated silica gel into a lower alkane solvent, followed by addition of an alkyl aluminum compound, and then reacting the mixture for a period of time, followed by evaporating the solvent and drying, thereby obtaining a solid powder;

(3) dissolving the titanium compound and the magnesium compound into the electron donor compound to prepare a mother liquor, wherein the titanium compound is added into the electron donor compound before or after the addition of the magnesium compound, or both the titanium compound and the magnesium compound are added simultaneously;

(4) adding the carrier material activated in step (2) into the mother liquor from step (3) and reacting them for a period of time, followed by drying to remove excess solvent, i.e. the electron donor compound, with its residual content being controlled to be in the range of 10 percent by weight to 21 percent by weight, thereby obtaining a solid material;

(5) suspending the solid material from step (4) in a lower alkane solvent and then reducing with one or more alkyl aluminum compounds, followed by drying, thereby obtaining the final catalyst component.

The lower alkane solvents used in step (2) and step (5) can be $C_3$–$C_9$ alkanes, preferably $C_5$ and $C_6$ alkanes, such as isopentane, pentane, hexane and the like.

The alkyl aluminum compounds which can be used in step (2) and step (5) are preferably those represented by general formula $AlR'_m X_{3-m}$, wherein R' can be same or different and represents $C_1$–$C_8$ alkyl groups, X represents a halogen, m is an integer of 1 to 3. Preferable alkyl aluminium compounds are $AlEt_3$, $Al(n-C_6H_{13})_3$, $AlEt_2Cl$, and the like.

It should be particularly noted that the halide promoter in accordance with the present invention can be incorporated into the catalyst component by any effective manner. For example, an excellent promotion effect can be achieved by adopting one of the following methods: i) adding during the treatment of the carrier material in step (2), ii) adding during step (4) for supporting the catalyst complex from step (3) onto the carrier material and iii) adding during the reduction of the catalyst in step (5).

The present invention also relates to a catalyst for ethylene (co)polymerization, which is a reaction product of the above titanium-containing catalyst component and an alkyl aluminum compound, wherein the alkyl aluminum compound used is represented by the general formula $AlR''_3$, in which R'' can be same or different and represents $C_{1-8}$ alkyl groups, one or two of which can be replaced by chlorine. Preferable alkyl aluminum compounds are $AlEt_3$, $Al(iso-Bu)_3$, $Al(n-C_6H_{13})_3$, $Al(n-C_8H_{17})_3$, $AlEt_2Cl$ and the like. The alkyl aluminum compounds can be used alone or in a mixture of two or more of them.

The catalyst according to the present invention is suitable for ethylene homopolymerization and copolymerization of ethylene and α-olefins, with the α-olefins being propylene, butene, pentene, hexene, 4-methylpentene-1, octene, and the like. The polymerization reaction can be carried out by a slurry process, a gas phase process or a solution process. The catalyst according to the present invention is more suitable for gas phase fluidized bed polymerization, especially for gas phase fluidized bed process operated in a condensed state. The polymerization temperature can be ranged from 50° C. to 100° C.

It should be particularly noted that by using silica gel having a larger specific surface area, the titanium content in the catalyst component is substantially enhanced while good particulate property of the catalyst is guaranteed, which provides the basis for enhancing the activity of the resultant catalyst. At the same time, by fixing the halide promoter carrying a functional group on the surface of silica gel by chemical reaction, the properties of polymers produced by using the resultant catalyst do not deteriorate due to the increase in the specific surface area of the carrier, and both the hydrogen response of the catalyst and copolymerizability of ethylene with other alpha-olefins are improved. Therefore, the disadvantages associated with the conventional silica gel-supported catalysts when used in a gas phase fluidized bed process operated in a condensed state, i.e., low catalytic activity, high ash content and low polymer quality, are overcome. The catalyst according to the present invention is especially suitable for gas phase fluidized bed process operated in a condensed state to produce high quality LLDPE resins.

EXAMPLES

The catalyst according to the present invention is described in more details by the following examples, but the catalyst system according to the present invention is not limited to them.

The physical parameters involved are measured by the following standard procedures:

Specific Surface Area, Pore Volume and Average Pore Diameter: Mercury Intrusion (AUTOPORE 9410, MICROMERITICS, USA)

Melt Index (MI): ASTM D-1238(2.16 kg)

Melt Flow Index (FI): ASTM D-1238(21.6 kg)

Apparent Density (BD): ASTM D-1895

Density (D): ASTM D-1505

Example 1

Preparation of Catalyst Component:

(1) 12 g of spherical silica gel (GRACE silica, SMR#49-3039 available from Grace Corporation, USA; average particle size=55 microns, specific surface area=717 m$^2$/g, pore volume=4.6 ml/g and average pore diameter=25.7 nanometers) is weighed and then activated at a temperature of 600° C. for 4 hours.

(2) Under nitrogen, to a flask equipped with a stirrer and containing isopentane (100 ml) as solvent are added 10 g the heat-activated silica from step (1) and 5.6 ml of a solution of AlEt$_3$ in hexane (1 mmol/ml). The mixture is reacted at a temperature of 20–30° C. for half an hour, followed by slow drop addition of 1.1 ml Cl$_3$CCH$_2$OH. After the completion of addition, the mixture is reacted for half an hour and then is dried by sweeping with highly pure nitrogen, thereby obtaining flowable powders.

(3) To another flask equipped with a stirrer are added 1.74 g MgCl$_2$, 0.64 ml TiCl$_4$ and 174 ml tetrahydrofuran. The mixture is heated under stirring to reflux for 5 hours, thereby obtaining a catalyst mother liquor.

(4) The silica treated in step (2) is mixed with the catalyst mother liquor from step (3). The mixture is stirred under refluxing for 1 hour, followed by drying by sweeping with highly pure nitrogen, thereby obtaining flowable, pale yellow solid powders containing 16.0 percent by weight of THF.

(5) The product from step (4) is prereduced in 100 ml isopentane at room temperature by first drop adding 7.2 ml of a solution of AlEt$_2$Cl in hexane (2.21 mmol) with the molar ratio of AlEt$_2$Cl/THF being 0.45, after the completion of addition, the mixture is reacted for half an hour, followed by drop adding 4.8 ml of a solution of Al(n-C$_6$H$_{13}$)$_3$ in hexane (1.5 mmol) with the molar ratio of Al(n-C$_6$H$_{13}$)$_3$/THF being 0.20, after the completion of addition, the mixture is reacted for half an hour and then dried by sweeping with highly pure nitrogen, thereby obtaining slightly yellow, solid powdery catalyst component. The catalyst component contains 1.16 percent by weight of Ti, 1.83 percent by weight of Mg, 4.37 percent by weight of Al and 13.23 percent by weight of Cl and has a specific surface area of 364 m$^2$/g and a pore volume of 2.4 ml/g, as measured by mercury intrusion (Apparatus: AUTOPORE 9410, MICROMERITICS, USA).

Slurry homopolymerization of ethylene. The slurry polymerization is carried out in a 2 liter stainless steel autoclave. The conditions are as follows: the catalyst component, 50 mg; H$_2$/C$_2$H$_4$=0.28/0.75 MPa; 1 ml of a solution of AlEt$_3$ in hexane (1 mmol/ml); hexane, 1 liter; 80° C.; 2 hours. The polymerization results are listed in Table 1.

Gas phase copolymerization of ethylene and butene: The polymerization is carried out in a φ 150 mm fluidized bed for gas phase polymerization of ethylene, in the presence of 0.2 g catalyst, 5 mmol AlEt$_3$ and 600 g polyethylene powders as dispersant, under the following polymerization conditions: total pressure, 1.7 MPa; temperature, 88° C.; composition of the mixed gas (percent by volume): H$_2$=12.35, C$_2$H$_4$=59.47, 1-C$_4$H$_8$=14.57, N$_2$=13.61; 4 hours. The polymerization results are listed in Table 2.

Example 2

The catalyst component is prepared in a same manner as that in Example 1 except that (1) 1.3 ml Cl$_3$CCOCl is used instead of 1.1 ml Cl$_3$CCH$_2$OH to treat the silica gel; (2) the powder obtained in step (4) contains 15.7 percent by weight of THF; and (3) Ti content in the resultant catalyst component is 1.29 percent by weight.

The resultant catalyst is evaluated in the slurry polymerization in a same manner as that in Example 1 and the polymerization results are listed in Table 1.

Example 3

The catalyst component is prepared in a same manner as that in Example 1 except that (1) 1.16 g TiCl$_3$(AA grade) is used in place of 0.64 ml TiCl$_4$ during the preparation of the catalyst mother liquor; (2) the powder obtained in step (4) contains 17.7 percent by weight of THF; and (3) Ti content in the resultant catalyst component is 1.14 percent by weight.

The resultant catalyst is evaluated in the slurry polymerization in a same manner as that in Example 1 and the polymerization results are listed in Table 1.

Example 4

The catalyst component is prepared in a same manner as that in Example 1 except that (1) 1.16 g TiCl$_3$(AA grade) is used in place of 0.64 ml TiCl$_4$ during the preparation of the catalyst mother liquor; (2) 1.3 ml of Cl$_3$CCOCl is used instead of 1.1 ml Cl$_3$CCH$_2$OH to treat the silica gel; (3) the powder obtained in step (4) contains 17.2 percent by weight of THF; and (4) Ti content in the resultant catalyst component is 1.07 percent by weight.

The resultant catalyst is evaluated in the slurry polymerization in a same manner as that in Example 1 and the polymerization results are listed in Table 1.

Comparative Example 1

The catalyst component is prepared in a same manner as that in Example 1 except that (1) no Cl$_3$CCH$_2$OH is used to treat the silica gel; (2) the powder obtained in step (4) contains 19.1 percent by weight of THF; and (3) Ti content in the resultant catalyst component is 1.36 percent by weight.

The resultant catalyst is evaluated in the slurry polymerization in a same manner as that in Example 1 and the polymerization results are listed in Table 1.

Comparative Example 2

The catalyst component is prepared in a same manner as that in Example 1 except that (1) no $Cl_3CCH_2OH$ is used to treat the silica gel; (2) 1.169 of $TiCl_3$(AA grade) is used in place of 0.64 ml $TiCl_4$ during the preparation of the catalyst mother liquor; (3) the powder obtained in step (4) contains 17.2 percent by weight of THF; and (4) Ti content in the resultant catalyst component is 1.26 percent by weight.

The resultant catalyst is evaluated in the slurry polymerization in a same manner as that in Example 1 and the polymerization results are listed in Table 1.

Comparative Example 3

The catalyst component is prepared in a same manner as that in Example 1 except that (1) SYLOPOL 948 silica gel (manufactured by Grace Corporation, USA, average particle size=50 microns, specific surface area=295 m²/g, pore volume=1.7 ml/g and average pore diameter=23.3 nanometers) is used instead of the silica gel used in Example 1, with its amount being unchanged and no $Cl_3CCH_2OH$ is used to treat the silica gel; (2) 1.19 of $MgCl_2$, 0.4 ml of $TiCl_4$ and 100 ml THF are used during the preparation of the catalyst mother liquor; (3) the powder obtained in step (4) contains 13.5 percent by weight of THF; and (4) Ti content in the resultant catalyst component is 0.9 percent by weight.

The resultant catalyst component has a specific surface area of 230 m²/g and a pore volume of 1.8 ml/g, as measured by mercury intrusion (Apparatus: AUTOPORE 9410, MICROMERITICS, USA).

The resultant catalyst is evaluated in the slurry polymerization in a same manner as that in Example 1 and the polymerization results are listed in Table 1.

Comparative Example 4

The catalyst component is prepared in a same manner as that in Example 1 except that (1) SYLOPOL 948 silica gel is used instead of the silica gel used in Example 1, with its amount being unchanged and no $Cl_3CCH_2OH$ is used to treat the silica gel; (2) 1.1 g of $MgCl_2$, 0.73 g of $TiCl_3$ and 100 ml THF are used during the preparation of the catalyst mother liquor, (3) the powder obtained in step (4) contains 14.2 percent by weight of THF; and (4) Ti content in the resultant catalyst component is 0.95 percent by weight.

The resultant catalyst is evaluated in the slurry polymerization in a same manner as that in Example 1 and the polymerization results are listed in Table 1.

Example 5

The catalyst component is prepared in a same manner as that in Example 1 except that (1) 1.16 g $TiCl_3$(AA grade) is used in place of 0.64 ml $TiCl_4$ during the preparation of the catalyst mother liquor; (2) $Cl_3CCH_2OH$ is used in an amount of 175 ml instead of 1.1 ml to treat the silica gel; (3) the powder obtained in step (4) contains 13.7 percent by weight of THF; and (4) Ti content=1.36 percent by weight, Mg content=2.65 percent by weight, Al content=3.33 percent by weight and Cl content=14.23 percent by weight.

The resultant catalyst is evaluated in the slurry polymerization in a same manner as that in Example 1 and the polymerization results are listed in Table 1.

Gas phase copolymerization of ethylene and butene: The polymerization is carried out in a φ 150 mm fluidized bed for gas phase polymerization of ethylene, in the presence of 0.2 g catalyst, 5 mmol $AlEt_3$ and 600 g polyethylene powders as dispersant, under the following polymerization conditions: total pressure, 1.7 MPa; temperature, 88° C.; composition of the mixed gas (percent by volume): $H_2$=15.05, $C_2H_4$=65.60, 1-$C_4H_8$=13.73, $N_2$=5.62; 4 hours. The polymerization results are listed in Table 2.

Example 6

The catalyst component is prepared in a same manner as that in Example 1 except that (1) 1.16 g $TiCl_3$(AA grade) is used in place of 0.64 ml $TiCl_4$ during the preparation of the catalyst mother liquor; (2) 1.1 ml of $Cl_3CCOCl$ is used instead of 1.1 ml of $Cl_3CCH_2OH$ to treat the silica gel; (3) the powder obtained in step (4) contains 14.2 percent by weight of THF; and (4) Ti content=1.37 percent by weight, Mg content=2.63 percent by weight, Al content=2.61 percent by weight and Cl content=12.36 percent by weight.

The resultant catalyst is evaluated in the slurry polymerization in a same manner as that in Example 1 and the polymerization results are listed in Table 1.

Gas phase copolymerization of ethylene and butene: The polymerization is carried out in a φ 150 mm fluidized bed for gas phase polymerization of ethylene, in the presence of 0.2 g catalyst, 5 mmol $AlEt_3$ and 600 g polyethylene powders as dispersant, under the following polymerization conditions: total pressure, 1.7 MPa; temperature, 88° C.; composition of the mixed gas (percent by volume): $H_2$=8.49, $C_2H_4$=75.93, 1-$C_4H_8$=5.74, $N_2$=9.85; 4 hours. The polymerization results are listed in Table 2.

TABLE 1

Evaluation of catalysts

| Catalyst | Ti % | Activity gPE/ g Cat | Activity (10⁴)g PE/g Ti | BD g/cm³ | Ml g/10 min | Fl g/10 min | MF R | Particle size distribution of PE (mesh) | | | | | | | | Fine Powder >80 |
|---|---|---|---|---|---|---|---|---|---|---|---|---|---|---|---|---|
| | | | | | | | | <20 | 20–40 | 40–65 | 65–80 | 80–100 | 100–140 | 140–200 | >200 | |
| Ex. 1 | 1.26 | 6667 | 52.9 | 0.35 | 0.53 | 15.92 | 30.0 | 89.8 | 9.6 | 0.4 | 0.01 | 0.06 | 0.05 | 0.04 | 0.06 | 0.2 |
| Ex. 2 | 1.29 | 6160 | 47.8 | 0.34 | 0.53 | 16.44 | 31.0 | 86.1 | 10.6 | 1.4 | 0.5 | 0.3 | 0.4 | 0.4 | 0.3 | 1.4 |
| Ex. 3 | 1.14 | 4955 | 43.5 | 0.37 | 0.52 | 17.20 | 33.1 | 74.9 | 20.9 | 2.3 | 0.7 | 0.4 | 0.6 | 0.4 | 0.3 | 1.7 |
| Ex. 4 | 1.07 | 4649 | 43.4 | 0.38 | 0.52 | 15.30 | 29.4 | 61.3 | 28.9 | 4.0 | 1.6 | 1.0 | 1.3 | 1.2 | 0.7 | 4.2 |
| Ex. 5 | 1.26 | 6450 | 51.2 | 0.32 | 0.55 | 16.0 | 29.1 | 85.3 | 12.9 | 1.0 | 0.2 | 0.2 | 0.2 | 0.2 | 0.2 | 0.8 |
| Ex. 6 | 1.10 | 2800 | 25.5 | 0.35 | 0.26 | 7.9 | 30.4 | 63.8 | 32.1 | 2.2 | 0.5 | 0.4 | 0.4 | 0.4 | 0.2 | 1.4 |

TABLE 1-continued

Evaluation of catalysts

| Catalyst | Ti % | Activity gPE/ g Cat | Activity $(10^4)$g PE/g Ti | BD g/cm$^3$ | Ml g/10 min | Fl g/10 min | MFR | <20 | 20–40 | 40–65 | 65–80 | 80–100 | 100–140 | 140–200 | >200 | Fine Powder >80 |
|---|---|---|---|---|---|---|---|---|---|---|---|---|---|---|---|---|
| Comp. Ex. 1 | 1.36 | 3946 | 29.0 | 0.32 | 0.18 | 5.41 | 30.1 | 73.5 | 22.9 | 1.8 | 0.4 | 0.2 | 0.2 | 0.2 | 0.8 | 1.4 |
| Comp. Ex. 2 | 1.26 | 2402 | 19.1 | 0.37 | 0.20 | 6.78 | 33.9 | 34.7 | 54.4 | 4.7 | 1.4 | 0.9 | 1.2 | 1.5 | 1.3 | 4.9 |
| Comp. Ex. 3 | 0.90 | 1200 | 13.3 | 0.32 | 0.51 | 15.4 | 30.2 | 12.1 | 60.1 | 24.0 | 1.9 | 0.5 | 0.5 | 0.6 | 0.3 | 1.9 |
| Comp. Ex. 4 | 0.95 | 1160 | 12.2 | 0.38 | 0.52 | 16.3 | 31.3 | 11.4 | 61.6 | 22.5 | 1.5 | 0.7 | 0.8 | 0.8 | 0.7 | 3.0 |

TABLE 2

Evaluation for gas phase fluidized bed($\Phi$150) polymerization of catalysts

| Catalyst | Activity g PE/ g Cat | BD g/cm$^3$ | Ml g/10 min | Fl g/10 min | MFR | D g/ml | <20 | 20–40 | 40–65 | 65–80 | 80–100 | 100–140 | 140–200 | >200 | Fine Powder >60 |
|---|---|---|---|---|---|---|---|---|---|---|---|---|---|---|---|
| Ex. 1 | 3950 | 0.33 | 7.5 | 225.3 | 29.96 | 0.9247 | 57.6 | 38.2 | 3.2 | 0.5 | 0.3 | 0.2 | 0.0 | 0.0 | 0.5 |
| Ex. 5 | 5910 | 0.30 | 8.6 | 254.0 | 29.46 | 0.9281 | 57.3 | 33.9 | 5.4 | 1.6 | 0.9 | 0.6 | 0.3 | 0.0 | 1.8 |
| Ex. 6 | 6160 | 0.31 | 1.4 | 41.54 | 29.89 | 0.9309 | 73.1 | 22.6 | 2.9 | 0.8 | 0.3 | 0.2 | 0.1 | 0.0 | 0.6 |

It can be seen from Table 1 and Table 2 that by using silica gel having a larger specific surface area in place of SYLOPOL 948 silica gel, the supporting ratio of the catalyst component onto the silica gel is increased from 28% to 38%, thereby substantially enhancing the titanium content of the resultant catalyst, which provides the basis for enhancing the activity of the resultant catalyst. At the same time, the good particle morphology of the catalyst is maintained. If no halide promoters such as Cl$_3$CCH$_2$OH, Cl$_3$CCOCl and the like are used during the preparation of the catalyst and only a silica gel having a larger specific surface area is used in place of SYLOPOL 948 silica gel, the activity of the resultant catalyst is largely enhanced and however, the resultant polyethylenes have a largely decreased Ml and Fl. By comparing Comparative Example 1 and Comparative Example 3, it can be seen that the activity of the catalyst is increased from 1200 g PE/g Cat to 3946 g PE/g Cat, at the same time, Ml is decreased from 0.51 g/10 min to 0.18 g/10 min. Further, by comparing Comparative Example 2 and Comparative Example 4, it can be seen that the activity of the catalyst is increased from 1160 g PE/g Cat to 2402 g PE/g Cat, at the same time, Ml is decreased from 0.52 g/10 min to 0.20 g/10 min. These results clearly demonstrate that by simply replacing silica gel having a smaller specific surface area with silica gel having a larger specific surface area, the activity of the catalyst is substantially increased and however, its hydrogen response substantially deteriorates. Therefore, such an increase in the activity makes no sense for the preparation of ethylene polymers having certain melt indexes.

In order to overcome such a disadvantage, a halide promoter such as Cl$_3$CCH$_2$OH or Cl$_3$CCOCl is incorporated during the preparation of the catalyst according to the present invention and the experimental results indicate that the activity of the catalyst is substantially enhanced and at the same time, polyethylenes have a constant Ml. For example, by comparing Example 1 and Comparative Example 3, it can be seen that the activity of the catalyst is increased from 1200 g PE/g Cat to 6667 g PE/g Cat, with Ml being essentially the same; by comparing Example 2 and Comparative Example 3, it can be seen that the activity of the catalyst is increased from 1200 g PE/g Cat to 6160 g PE/g Cat, with Ml being essentially the same. When Cl$_3$CCH$_2$OH is used as the halide promoter, by comparing Example 3 and Comparative Example 4, it can be seen that the activity of the catalyst is increased from 1160 g PE/g Cat to 4955 g PE/g Cat, with Ml being the same; when Cl$_3$CCOCl is used as the halide promoter, by comparing Example 4 and Comparative Example 4, it can be seen that the activity of the catalyst is increased from 1160 g PE/g Cat to 4649 g PE/g Cat, with Ml being the same. The above results clearly indicate that the catalysts according to the present invention have not only very high activity, but also excellent hydrogen response, thus suitable for ethylene (co)polymerization by a gas phase process and a slurry process, especially for the gas phase fluidized bed process operated in a condensed state. Since the catalysts according to the present invention have a high activity, the polyethylenes made by using them have low ash content. By employing the catalysts according to the present invention, various brands of polyethylene resins, especially LLDPE resins can be produced with low cost and high quality.

What is claimed is:
1. A supported catalyst component comprising:
   (i) a titanium-containing active component comprising the reaction product of:
      a) at least one titanium compound;
      b) at least one magnesium compound, wherein the magnesium compound is represented by the following general formula:

MgX$_2$ wherein X is Cl, Br, I or combinations thereof
   c) at least one halide promoter;
   d) at least one electron donor; and (ii) a porous inert carrier material, wherein said porous inert carrier material is spherical or spheroidal silica gel having an average particle size of 10 to 100 microns and a specific surface area of 300 to 1000 m²/g, said active component being supported on the carrier material.

2. The supported catalyst component according to claim 1 wherein said titanium compound is represented by any of the following general formulae:

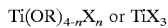

$$Ti(OR)_{4-n}X_n \text{ or } TiX_3$$

wherein R is a $C_1$–$C_{14}$ aliphatic hydrocarbyl, X is F, Cl, Br or combinations thereof and n is an integer of 1 to 4.

3. The supported catalyst component according to claim 2 wherein said titanium compound is selected from titanium tetrachloride, titanium trichloride, titanium tetrabromide, titanium tetraiodide, titanium tetrabutoxide, titanium tetraethoxide, triethoxy titanium chloride, diethoxy titanium dichloride, ethoxy titanium and mixtures thereof.

4. The supported catalyst component according to claim 1 wherein said magnesium compound is selected from the group consisting of magnesium, dichloride, magnesium dibromide, magnesium diiodide and mixtures thereof.

5. The supported catalyst component according to claim 1 wherein said halide promoter is a class of compounds represented by general formula F—$R^1[R^2_bX_{(3-b)}]$, wherein F represents a functional group selected from the group consisting of aldhehyde, acyl, hydroxyl, amino, and ester; $R_1$ represents a divalent $C_1$–$C_6$ aliphatic or aromatic group which is attached to the functional group F; $R^2$ represents hydrogen, unsubstituted or halogen-substituted $C_1$–$C_6$ alkyl, $C_3$–$C_6$ cycloalkyl or $C_6$–$C_{10}$ aromatic groups, b is 0, 1 or 2 and X is F, Cl or Br.

6. The supported catalyst component according to claim 5 wherein said halide promoter is selected from the group consisting of 2,2,2-trichloroethanol, 2,2-dichloroethanol, 2-chloroethanol, 1,1-dimethyl-2,2,2-trichloroethanol, 4-chlorobutanol, para-chlorophenol, iso-chlorophenol, ortho-chlorophenol and 2-chlorocyclohexanol.

7. The supported catalyst component according to claim 5 wherein said halide promoter is selected from the group consisting of trichloroacetyl chloride, dichloroacetyl chloride, chloroacetyl chloride, o-chlorobenzoyl chloride and 2-chlorocyclohexyl carbonyl chloride.

8. The supported catalyst component according to claim 1 wherein said electron donor is selected from the group consisting of alkyl esters of $C_1$–$C_4$ saturated aliphatic carboxylic acids, alkyl esters of $C_7$–$C_8$ aromatic carboxylic acids, $C_2$–$C_6$ aliphatic esters, $C_3$–$C_4$ cyclic ethers, $C_3$–$C_6$ saturated aliphatic ketones and mixtures thereof.

9. The supported catalyst component according to claim 8 wherein said electron donor is selected from the group consisting of methyl formate, ethyl acetate, butyl acetate, diethyl ether, dihexyl ether, tetrahydrofuran, acetone, methyl isobutyl ketone and mixtures thereof.

10. The supported catalyst component according to claim 1 wherein the magnesium compound, the electron donor and the halide promoter are used in amounts of 0.5 to 50 moles, 0.5 to 50 moles and 0.5 to 50 moles, per mole of the titanium compound, respectively.

11. The supported catalyst component according to claim 1 wherein said silica gel has a pore volume of 1.0 to 6.0 ml/g and an average pore diameter of 5 to 45 nanometers.

12. The supported catalyst component according to claim 1 wherein said silica gel has a specific surface area of 400 to 800 m²/g.

13. The supported catalyst component according to claim 12 wherein said silica gel has an average particle size of 20 to 80 microns, a pore volume of 2.0 to 5.0 ml/g and an average pore diameter of 10 to 35 nanometers.

14. The supported catalyst component according to claim 1 wherein said silica gel has a specific surface area of 600 to 800 m²/g.

15. A catalyst comprising the reaction product of: A) the supported catalyst component according to claim 1, and B) an alkyl aluminum compound.

16. The catalyst according to claim 15 wherein the alkyl aluminum compound is selected from the group consisting of $AlEt_3$, $Al(iso-Bu)_3$, $Al(n-C_6H_{13})_3$, $Al(n-C_8H_{17})_3$, $AlEt_2Cl$ and mixtures thereof.

17. A method for ethylene (co)polymerization comprising:
   (i) providing the catalyst component of claim 15, and
   (ii) copolymerizing ethylene and another olefin in a gas phase or slurry process in the presence of said catalyst.

18. A method for ethylene polymerization comprising:
   (i) providing the catalyst of claim 15; and
   (ii) polymerizing ethylene by a gas phase fluidized bed process operated in a condensed state in the presence of said catalyst.

* * * * *